(12) United States Patent
Figger et al.

(10) Patent No.: US 11,051,457 B2
(45) Date of Patent: Jul. 6, 2021

(54) VARIABLE WIDTH TWINE DISC ASSEMBLY

(71) Applicant: AGCO Corporation, Duluth, GA (US)

(72) Inventors: Robert L. Figger, Hesston, KS (US);
David A. Becker, Newton, KS (US)

(73) Assignee: AGCO Corporation, Duluth, GA (US)

( * ) Notice: Subject to any disclaimer, the term of this patent is extended or adjusted under 35 U.S.C. 154(b) by 119 days.

(21) Appl. No.: 16/462,322

(22) PCT Filed: Oct. 25, 2017

(86) PCT No.: PCT/IB2017/001284
§ 371 (c)(1),
(2) Date: May 20, 2019

(87) PCT Pub. No.: WO2018/091956
PCT Pub. Date: May 24, 2018

(65) Prior Publication Data
US 2019/0269074 A1    Sep. 5, 2019

Related U.S. Application Data

(60) Provisional application No. 62/423,885, filed on Nov. 18, 2016.

(51) Int. Cl.
*A01F 15/14* (2006.01)
(52) U.S. Cl.
CPC .................. *A01F 15/145* (2013.01)
(58) Field of Classification Search
CPC ...................................... A01F 15/145
USPC ........................................................... 289/14
See application file for complete search history.

(56) References Cited

U.S. PATENT DOCUMENTS

| 2,703,246 | A |   | 3/1955 | Bomzin |  |
|---|---|---|---|---|---|
| 3,108,831 | A | * | 10/1963 | Harper | B65B 13/26 |
|  |  |  |  |  | 289/12 |
| 3,140,109 | A |   | 7/1964 | Lee et al. |  |
| 3,214,206 | A | * | 10/1965 | Sullivan | A01F 15/145 |
|  |  |  |  |  | 289/14 |
| 3,215,460 | A | * | 11/1965 | Bledsoe | A01F 15/145 |
|  |  |  |  |  | 289/14 |
| 3,305,257 | A |   | 2/1967 | Grillot |  |

(Continued)

FOREIGN PATENT DOCUMENTS

| FR | 1 483 166 A | 6/1967 |
|---|---|---|
| FR | 1 496 980 A | 10/1967 |
| GB | 646604 A | 11/1950 |

(Continued)

OTHER PUBLICATIONS

European Patent Office, International Search Report for International Application No. PCT/IB2017/001284, dated Jan. 16, 2018.

(Continued)

*Primary Examiner* — Shaun R Hurley

(57) ABSTRACT

In one embodiment, a variable width twine disc assembly, comprising: a fixed assembly comprising a first disc (24) having notches spaced along a periphery of the first disc (24) and a shaft (28); and a second disc (22) having notches spaced along a periphery of the second disc (22) and configured to be moveably adjusted along the shaft (28).

14 Claims, 4 Drawing Sheets

(56) References Cited

U.S. PATENT DOCUMENTS 4,142,746 A    3/1979  White

FOREIGN PATENT DOCUMENTS

GB    1 146 035 A    3/1969
GB     1175939 A    1/1970

OTHER PUBLICATIONS

UK Intellectual Property Office, Search Report for related UK Application No. 1620885.2, dated Dec. 8, 2016.

* cited by examiner

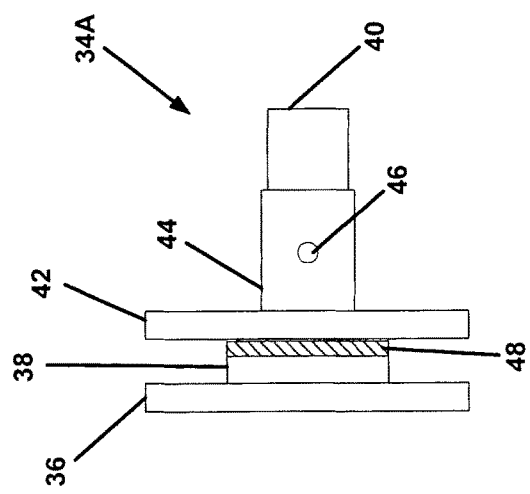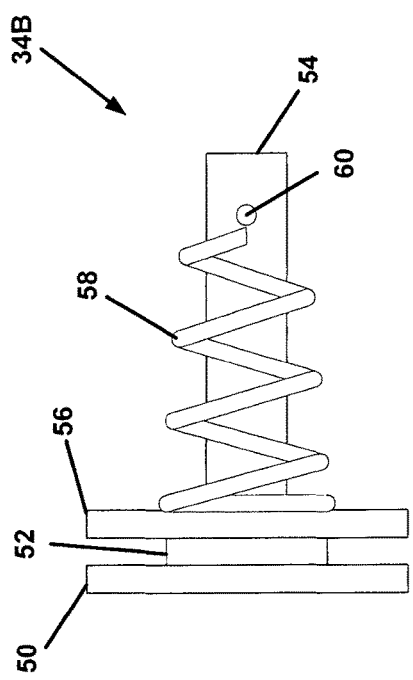
FIG. 3A
FIG. 3B

VARIABLE WIDTH TWINE DISC ASSEMBLY

TECHNICAL FIELD

The present disclosure is generally related to knotters for balers, and, more particularly, twine discs.

BACKGROUND

Balers collect crop material from a field, and form the collected material into compacted, rectangular or cylindrical bundles. The balers deploy knotters at the end of the process to wrap the bales in twine or other material to preserve the compacted form of the bale, and then deposit the bales on the ground for subsequent pick up for feed, bedding, haylage, silage, etc. Knotters provide an automated method to knot the twine, and use twine discs. The amount of twine discs used varies with the size of the baler. The twine discs are rotated in unison during a part of the knotting cycle. In general, each twine disc comprises a pair of parallel discs with notches at the periphery that are used to momentarily secure the twine and draw the twine when rotated to ensure correct alignment with a bill hook that is the situs for the formation of the knot.

As bale density increases, the size (e.g., circumference) of the twine increases to retain the compacted form of the heavier bale. However, large twine (e.g., for large square balers) applied to smaller bales may cause problems in the twine disc by getting jammed between the parallel discs. One solution is to use a wider disc (e.g., wider space between the pair of discs), but then issues, such as slippage, using the wider twine discs may arise when using standard-sized twine.

BRIEF DESCRIPTION OF THE DRAWINGS

Many aspects of a variable width twine disc assembly of the present disclosure can be better understood with reference to the following drawings. The components in the drawings are not necessarily to scale, emphasis instead being placed upon clearly illustrating the principles of a variable width twine disc assembly. Moreover, in the drawings, like reference numerals designate corresponding parts throughout the several views.

FIG. 3A is a schematic diagram that illustrates one embodiment of a variable width twine disc assembly.

FIG. 3B is a schematic diagram that illustrates another embodiment of a variable width twine disc assembly.

DESCRIPTION OF EXAMPLE EMBODIMENTS

Overview

Figure 1:
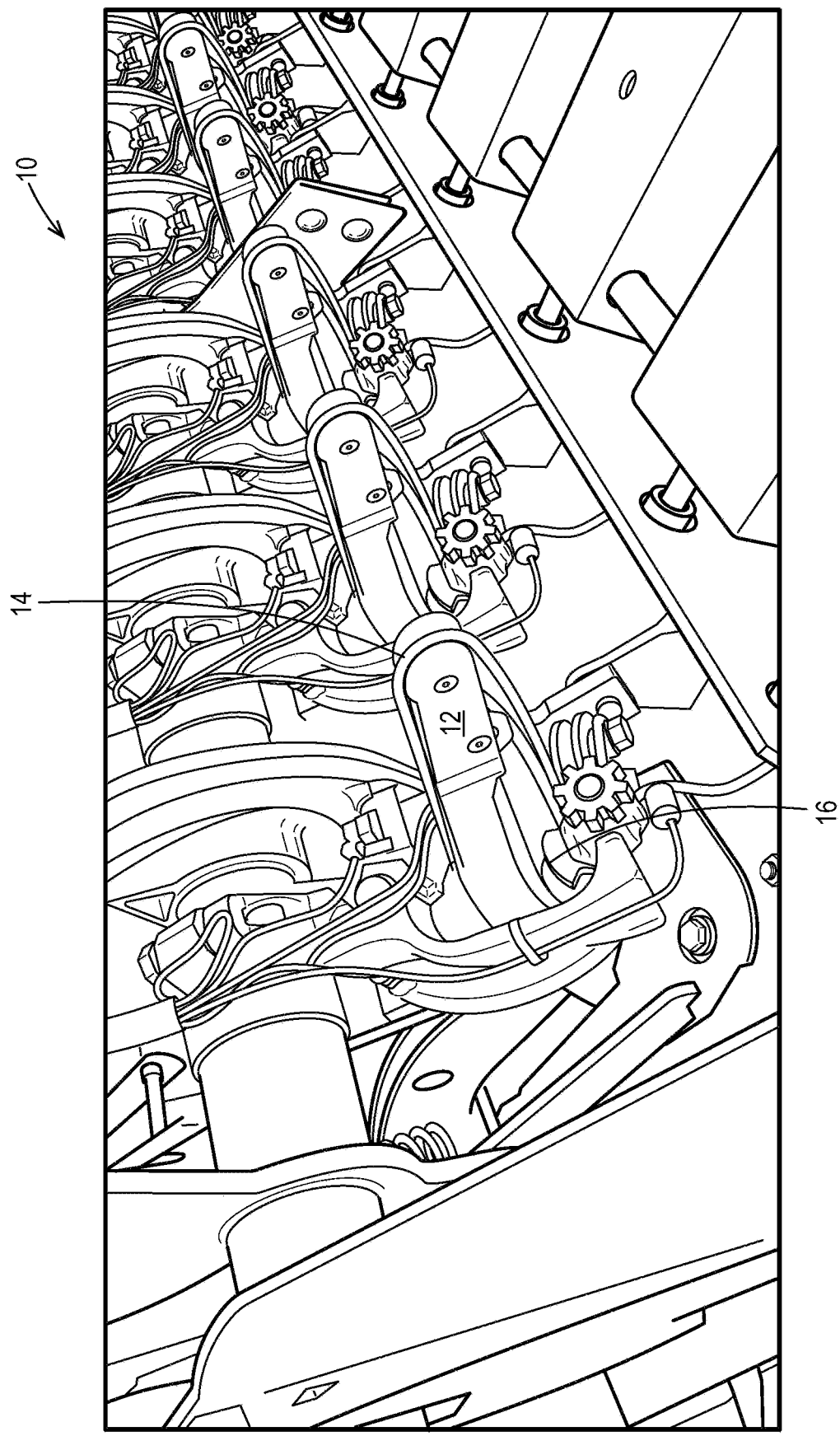
FIG. 1 is a schematic diagram of an example environment in which an embodiment of a variable width twine disc assembly may be used.

In one embodiment, a variable width twine disc assembly, comprising: a fixed assembly comprising a first disc having notches spaced along a periphery of the first disc and a shaft; and a second disc having notches spaced along a periphery of the second disc and configured to be moveably adjusted along the shaft.

DETAILED DESCRIPTION

Certain embodiments of a variable width twine disc assembly and associated systems and methods are disclosed that are structurally configured and interconnected to accommodate different twine dimensions for use in a knotting system of a square baler. In one embodiment, a variable width twine disc assembly comprises a fixed assembly (e.g., functionally operating as a single component) comprising a notched disc affixed to a shaft and another notched disc that can be moveably adjusted (e.g., slid, threaded, etc.) along the shaft and secured to any position along an incremental range of positions relative to the disc of the fixed assembly via the insertion of zero or more intervening shim components (e.g., washers). That is, the two notched discs may constitute a pair or set of discs, one of which may be variably positioned relative to the other. A base or default distance between the pair of discs may be achieved without any shims, and any desire to increase the distance between the two discs may be achieved by releasing a securement member (e.g., collar with key, bolt, etc.) from the shaft, moving (e.g., sliding, unthreading or unscrewing, etc.) the collar and the disc off the shaft, moving (e.g., sliding, screwing, etc.) onto the shaft one or more shim components to achieve the desired width, and then reversing the process to re-install the moveable disc and collar. In some embodiments, the ability to change (e.g., continuously as opposed to incrementally) the distance between discs may be achieved automatically via use of a spring, cylinder, etc. as set forth below.

Digressing briefly, current twine discs consist of a single, fixed assembly that, as described previously, attempt to provide a one-size-fits-all approach to the accommodation of twine, even though different twine may have different dimensions (e.g., circumference). In contrast, by segmenting the twine disc assembly into plural pieces, certain embodiments of a variable width twine disc assembly adjusts to different dimension twine, resulting in an adaptable space between the set of discs that is suitable for the various twine dimensions (e.g., suitable in that there is a lower risk of problems of jamming, slippage, etc. due to the dimension of the twine relative to conventional knotting systems).

Having summarized various features of certain embodiments of a variable width twine disc assembly of the present disclosure, reference will now be made in detail to the detailed description of the a variable width twine disc assembly as illustrated in the drawings. While the disclosure is described in connection with these drawings, there is no intent to limit it to the embodiment or embodiments disclosed herein. For instance, though emphasis is on an environment comprising a Massey Ferguson 2200 series large square baler, certain embodiments of a variable width twine disc assembly may be used in square balers of other designs, and hence are contemplated to be within the scope of the disclosure. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of a variable width twine disc assembly as defined by the appended claims. Further, it should be appreciated in the context of the present disclosure that the claims are not necessarily limited to the particular embodiments set out in the description.

Before commencement of the description associated with FIGS. 1-4, a brief explanation of an example square baler, though known in the industry, is helpful to establish a context for the discussion. In general, during baler operations (assuming a towed square baler, though similar principles apply for self-propelled balers), a mechanical flywheel, powered by a power take off (PTO) of a towing vehicle, provide mechanical energy via a PTO shaft to a mechanical flywheel located at the front of the baler. The mechanical flywheel in turn is operably coupled to a drive system that includes, principally, a gearbox, on-board hydraulics, chain drives, and plunger connecting rods, as well as known connecting components (e.g., shafts, etc.). The drive system provides a means for driving a plunger to reciprocate or cycle in fore-and-aft direction to compress crop material or a bale charge (flake) received in a fore-and-aft extending baling chamber. A controller (e.g., electronic control unit or ECU) may receive real-time cycle timing information from sensors and/or other control components (e.g., rotary encoder, positional sensors) coupled to one or more components of the drive system and/or plunger to calibrate the timing of the plunger stroke, or in some implementations, to enable direct feedback of plunger stroke positioning, or in some implementations, the correlation of plunger position and mechanical flywheel position and other timing information may be (deterministically) programmed into a controller.

The crop is received via a pickup assembly as the baler travels in the forward direction. The plunger reciprocates within the baling chamber in compression and retraction strokes across the opening at the bottom of the baling chamber. The opening serves as a conduit for crop material from the pickup assembly (the flake introduced through the opening via the stroke of a stuffer fork) to the baling chamber. When fully retracted, the plunger uncovers the opening, and when fully extended, the plunger completely covers and closes off the opening. The baling chamber serves as a compartment in which bales of crop material or charges or flakes are prepared. For instance, the baler may be an "extrusion" type baler in which the bale discharge orifice at the rear of the baler is generally smaller than upstream portions of the chamber such that the orifice restricts the freedom of movement of a previous bale and provides back pressure against which the reciprocating plunger within the baling chamber can act to compress charges of crop materials into the next bale. As baling operations are known in the industry, further discussion of the same is omitted here for brevity.

The baler includes a knotting system for the latter cycles of baling operations. A knotting system and its operations and structure (absent a variable width twine disc assembly as disclosed herein) are likewise well-established in the industry, however, a brief discussion of the same will similarly provide some context for the description of an embodiment of a variable width twine disc assembly. In general, when the required bale length is reached, a trip arm engages the knotting system. The knotting system may be a dual knotter twining system, for which an example description may be found in U.S. Pat. No. 4,142,746. In such a system, the first knot ties off a loop for the finished bale and the second knot starts a loop for the next bale. More specifically, and now referring to FIG. 1, shown is an example environment for an embodiment of a variable width twine disc assembly. FIG. 1 depicts a fragmentary view of a knotting system 10 for a Massey-Ferguson 2200 series large baler viewed from the top-down, though it should be appreciated by one having ordinary skill in the art that balers of other designs may similarly deploy certain embodiments of a variable width twine disc assembly, and hence are contemplated to be within the scope of the disclosure. In particular, shown are a plurality of needles, including needle 12, that sweep in an arcuate manner from a level beneath the plunger to the knotting system 10 shown in FIG. 1, drawing twine 14 over and past each twine disc set or pair 16. On the motion upward, the needle 12 presents strands of the twine 14 across a bill hook (obscured from view in FIG. 1) and through the co-aligned notches of each disc of the twine disc pair 16. Rotation of the discs of the twine disc pair 16 occur in unison and are achieved by the gear (e.g., 8-bladed gear at the top), the rotation serving to secure the strands of twine 14 to prevent escape of the same from the underlying bill hook. Interposed between the twine disc pair 16 is a blade element that cooperates with the twine disc pair 16 to hold or grip the twine 14 during the knotting cycle. In other words, the blade element wedges the twine 14 between the discs of the twine disc pair 16 momentarily during the knotting cycle. Upon a knot being formed at the bill hook, the needle 12 begins to withdraw past another notch of the disc pair 16 (the next notch positioned for the twine 14 via rotation of the disc pair 16), and a cutter disposed between the twine disc pair 16 and the bill hook sever the twine 14 and through known mechanisms of the assembly, also strip the finished knot from the bill hook and deposit the completed loop onto the bale. Given that the twine 14 is disposed between the discs of the twine disc pair 16, it is noteworthy that for conventional systems, too wide a twine 14 (large circumference) may cause the twine 14 to get hung up, and alternatively, too narrow a twine 14 (small circumference) may cause slippage from between the discs, causing failure or improper binding of the twine 14 to the bale.

Figure 2A:
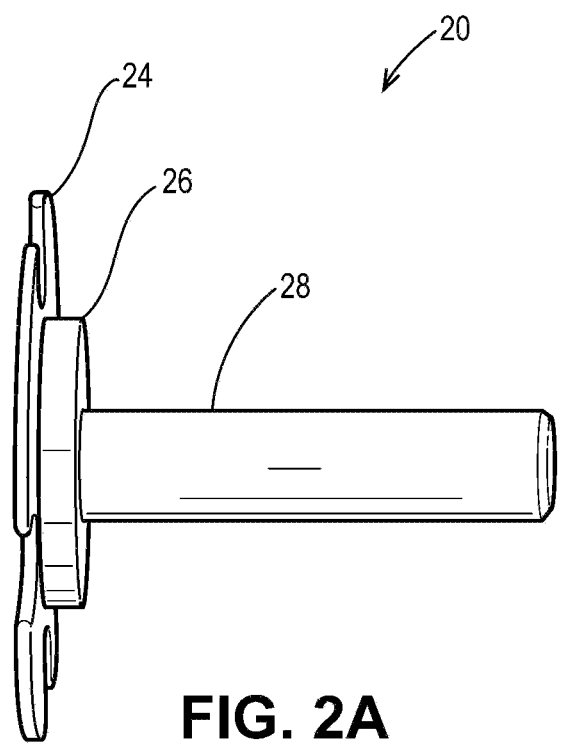
FIGS. 2A-2B are schematic diagrams that illustrate an example lower and upper section, respectively, of an embodiment of a variable width twine disc assembly.
Figure 2B:
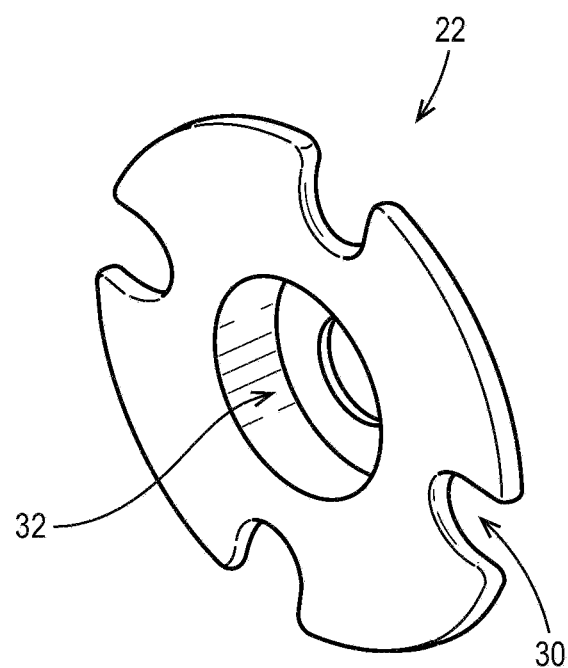

To address the issues of different-sized twine 14 that may be used in the knotting system 10 in general, certain embodiments of a variable width twine disc assembly provide for the width-adjustment of a multi-piece twine disc pair, which may be used as the twine disc pair 16 described in association with FIG. 1. In particular, and referring now to FIGS. 2A-2B, shown is a fixed assembly 20 of an embodiment of a twine disc assembly (FIG. 2A) and a moveable (e.g., slidable, rotatable, such as a screwing and unscrewing action, etc.) disc 22 of an embodiment of a twine disc assembly (FIG. 2B). With regard to FIG. 2A, the fixed assembly 20 comprises a disc 24 secured to a mount 26, the mount 26 in turn secured to a shaft 28. The mount 26 serves as a spacer to maintain a defined space between the discs 22, 24 at all times, and also serves to prevent (or mitigate the risk of) the twine from being shoved too far and getting stuck. Coupled to the end of the shaft 28 (not shown here, but illustrated in part in FIG. 1) is a gear that enables rotation of the assembly 20. Reference to the term, fixed, refers to the fact that the combination of components 24, 26, and 28 are structurally connected to each other and move as a single component. For instance, the fixed assembly 20 rotates as a single component, even though comprised of multiple components affixed to each other. The disc 24 is notched (described for similar notches of the moveable disc in FIG. 2B), and is of a larger diameter than the mount 26, though thinner. In some embodiments, different absolute or relative dimensions may be used. The disc 24 rotates with the shaft 28 by virtue of its connection to the shaft 28 through the mount 26. In one embodiment, the shaft 28 comprises a spline, though not limited as such (e.g., a keyway, d-shaped shaft may be used, among other known mechanical structures serving a similar purpose). Referring to FIG. 2B, the moveable disc 22 is configured structurally similar to the disc 24, and comprises plural notches 30 (e.g., four (4) shown in this example, though other quantities may be used in some embodiments) at the periphery of the disc 22. In one embodiment, the notches 30 are equidistant from each other, and are configured to facilitate the gripping of the twine. The disc 22 comprises a central opening 32 which enables the disc 22 to be moved (e.g., slid, screwed/unscrewed, etc.) along the shaft 28, and then secured in place by a collar (e.g., with a nut or key or otherwise tightened onto the shaft 28) or other releasable (e.g., removable) securement member. Rotation of the discs 22, 24 is about an axis coincident with the shaft 28, and indeed, occurs in unison (along with the shaft 28 while maintaining uniform alignment of the notches 30 of both discs 22, 24). As explained in association with FIG. 3A below, the width of the gap (e.g., the distance between the discs 22, 24) may be widened via the insertion onto the shaft 28 of one or more shim components (e.g., washers). Different width shim components may be used in some embodiments depending on the desired width, or the shim components may all be of the same dimension and stacked to obtain the desired width. In one embodiment, the change in width, according to the shim components, is incremental depending on the dimensions of the shim component(s). In some embodiments, as explained in association with FIG. 3B below, the disc 22 may be biased toward or away from the disc 24 in automatic fashion depending on forces imposed by the dimension of the twine.

Referring now to FIG. 3A, shown is one embodiment of a variable width twine disc assembly 34A. Note that the structure depicted in FIG. 3A is one example structure, and that variations to the structure may be made to enable width adjustment and such variations are contemplated to be within the scope of the disclosure. The variable width twine disc assembly 34A comprises a fixed assembly that comprises a notched (not visible in this depiction for simplicity) disc 36 (which is the same or similar to disc 24 of FIG. 2A), a mount 38 (which is the same or similar to mount 26 of FIG. 2A), and a shaft 40 (which is the same or similar to shaft 28 of FIG. 2A), all fixably coupled to one another in similar manner to that described for fixed assembly 20 (FIG. 2A). In one embodiment, the components 36, 38, and 40 may be welded together to comprise a single piece, or affixed to each other by other securing means (e.g., bolt, screws, etc.). In some embodiments, the components 36, 38, and 40 may collectively comprise a single-piece cast or forged component. The variable width twine disc assembly 34A further comprises a moveable, notched disc 42 (which is the same or similar to disc 22 of FIG. 2B, though not illustrated with a notch in this depiction for simplicity), which is of a similar design to the disc 36, yet a separate component that may be moved along (including off and onto) the shaft 40 and secured in place by a collar 44. In some embodiments, other releasable securement members in lieu of the collar 44 may be used. The collar 44 is moved (e.g., slid, screwed, clamped, etc.) onto the shaft 40, and secures the disc 42 in place. The collar 44 may have a securement member 46 comprising one of a screw, nut, or key, wherein tightening of the securement member 46 compresses the collar 44 against the shaft 40. In some embodiments, the collar 44 may comprises internal threads that engage with the shaft 40 and is tightened via a screwing motion against the disc 42. In the depicted example of FIG. 3A, a shim component 48 (shown with a patterned surface to distinguish from the other components) is inserted between the discs 36 and 42. The shim component 48 may be a washer or other structure to add width or distance between the discs 36 and 42. Though described as moved (e.g., slid) onto the shaft 40, in some embodiments, the shim component 48 may be clamped or screwed on depending on the structure/design of the shaft 40. Additional shim components of the same dimensions (or different dimensions in some embodiments) may be inserted between the discs 36 and 42 to adjust the gap or distance between the discs 36 and 42. For instance, the collar 44 may be slid off of the shaft 40, the disc 42 slid off the shaft 40, and a shim component 48 slid onto the shaft 40 (or one removed if already present) to satisfy the desired gap between the discs 36, 42. In other words, a default or base gap between the discs 36, 42 is realized without a shim component 48, and an added gap is achieved via adding onto the shaft 40 one or more shim components 48 to provide a suitable width for accommodating the twine to be used. Once the desired gap or distance between the discs 36, 42 has been achieved, the collar 44 is re-installed and, if needed, tightened.

Referring to FIG. 3B, shown is another embodiment of a variable width twine disc assembly 34B. Note that the structure depicted in FIG. 3B is one example structure, and that variations to the structure may be made to enable adjustment and such variations are contemplated to be within the scope of the disclosure. The variable width twine disc assembly 34B comprises a fixed assembly that comprises a notched disc 50 (which is the same or similar to disc 24 of FIG. 2A, though the notches omitted in this depiction for simplicity), a mount 52 (which is the same or similar to mount 26 of FIG. 2A), and a shaft 54 (which is the same or similar to shaft 28 of FIG. 2A, or in some embodiments, slightly longer to accommodate a spring), all fixably coupled to one another in similar manner to that described for fixed assembly 20 (FIG. 2A). The variable width twine disc assembly 34B further comprises a moveable, notched disc 56 (which is the same or similar to disc 22 of FIG. 2B, though the notches omitted in this depiction for simplicity). The moveable disc 56 is moveable along the shaft 54. Adjacent to, and in contact with the disc 56, is a spring 58 which is positioned onto the shaft 54. In one embodiment, one end of the spring 58 is in contact with the disc 56 (and in some embodiments, is coupled to the spring 58), and the other end of the spring 58 is secured directly or indirectly to the shaft 54. For instance, the spring 58 may be coupled to a nut or other securing member 60 that is affixed to the shaft 54. The spring 58 serves to dynamically bias the disc 56 to either move in a direction away from the disc 50 (enabling a continuously adjusted, versus incremental, wider gap or greater distance between the discs 50, 56) or in a direction that moves towards the disc 50 (enabling a smaller gap or shorter distance between the discs 50, 56). In other words, depending on the dimension of the twine that is introduced between the discs 50, 56, the bias is automatically (e.g., without user intervention) set in motion to widen or decrease the gap between the discs 50, 56.

Figure 4:
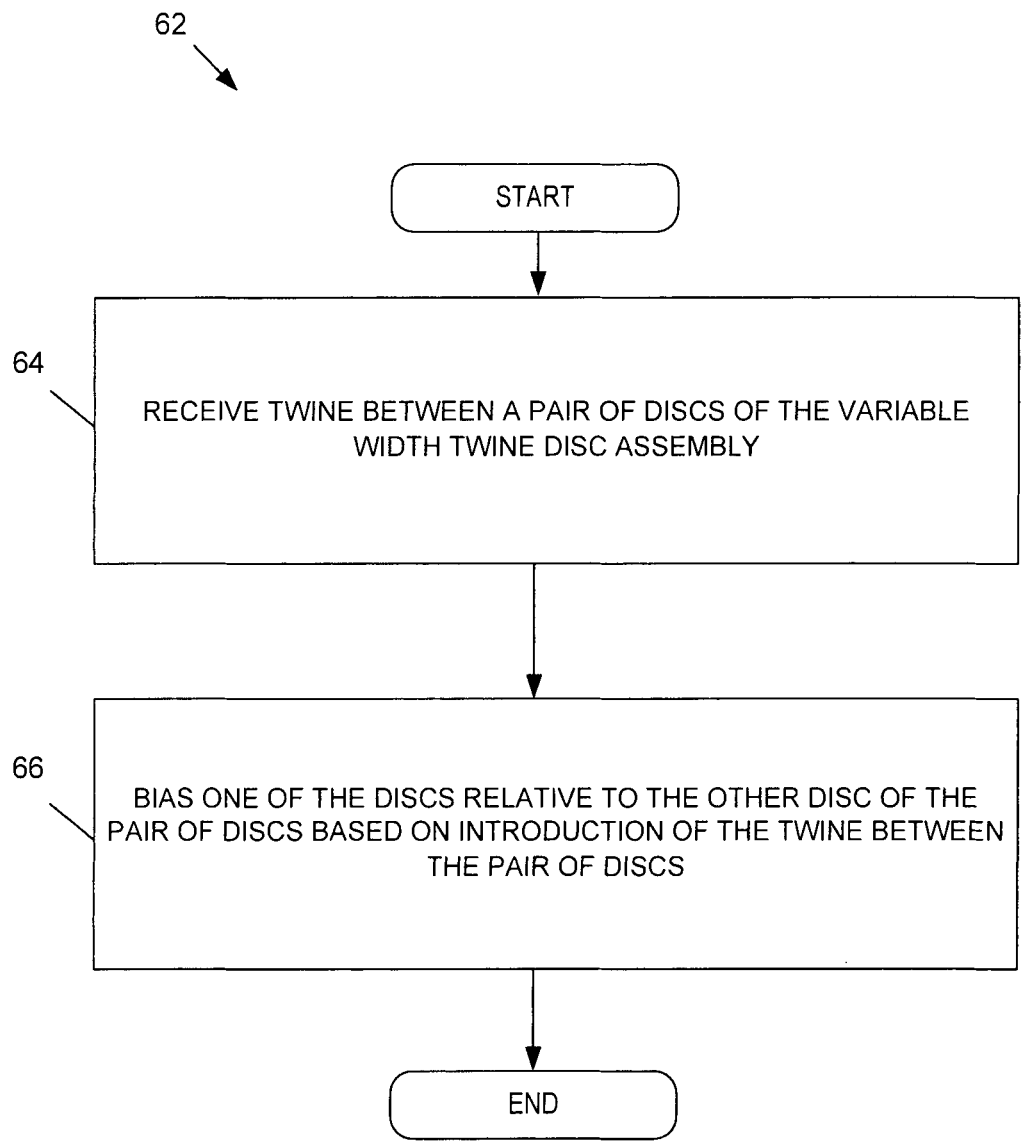
FIG. 4 is a flow diagram that illustrates an embodiment of an example method of automatically adjusting a distance between a pair of discs of a variable width twine disc assembly for accommodating twine of different dimensions.

Having described some example embodiments of a variable width twine disc assembly 34 (e.g., 34A, 34B), it should be appreciated in view of the present disclosure that one embodiment of a method of automatically adjusting a distance between a pair of discs of a variable width twine disc assembly for accommodating twine of different dimensions, the method depicted in FIG. 4 and denoted as method 62, comprises receiving twine between a pair of discs of the variable width twine disc assembly (64); and biasing one of the discs relative to the other disc of the pair of discs based on introduction of the twine between the pair of discs (66).

Any process descriptions or blocks in flow charts should be understood as representing steps in the process, and alternate implementations are included within the scope of the embodiments in which functions may be executed out of order from that shown or discussed, including substantially concurrently, depending on the functionality involved, as would be understood by those reasonably skilled in the art of the present disclosure.

It should be emphasized that the above-described embodiments of variable width twine disc assembly, knotting system and method are merely possible examples of implementations, merely set forth for a clear understanding of the principles of the variable width twine disc assembly, knotting system and method. Many variations and modifications may be made to the above-described embodiment(s) of the variable width twine disc assembly, knotting system and method without departing substantially from the spirit and principles of the disclosure. For instance, though described as a spring for performing the bias function in association with FIG. 3B, the spring may be replaced with other biasing mechanisms, including a pneumatic or hydraulic actuator. All such modifications and variations are intended to be included herein within the scope of the disclosure and protected by the following claims.

At least the following is claimed:

1. A variable width twine disc assembly, comprising:
a fixed assembly comprising a first disc having notches spaced along a periphery of the first disc and a shaft;
a second disc having notches spaced along a periphery of the second disc and configured to be moveably adjusted along the shaft; and
a spring disposed adjacent the second disc, the spring secured at one end to the shaft and at the other end in contact with the second disc, the spring configured to dynamically adjust a distance between the first and second discs.

2. The variable width twine disc assembly of claim 1, wherein the notches of the first and second discs are equally spaced from each other.

3. The variable width twine disc assembly of claim 1, wherein the notches of the first and second discs are aligned with each other during rotation.

4. A variable width twine disc assembly, comprising:
a fixed assembly comprising a first disc having notches spaced along a periphery of the first disc and a shaft; and
a second disc having notches spaced along a periphery of the second disc and configured to be moveably adjusted along the shaft;
wherein the second disc is secured in place in a first position by a releasable securement member, the first disc and the second disc separated uniformly by a first distance;
wherein the second disc is secured in place in a second position by the releasable securement member and one or more shim components, the one or more shim components arranged between the first and second discs, the first disc and the second disc separated uniformly by a second distance greater than the first distance.

5. The variable width twine disc assembly of claim 4, wherein a single shim component of the one or more shim components is used, and wherein the first distance equals a width of the single shim component.

6. The variable width twine disc assembly of claim 4, wherein at least one of the one or more shim components comprises a defined radius, and is configured to be moveably adjusted along the shaft.

7. The variable width twine disc assembly of claim 4, wherein the notches of the first and second discs are aligned with each other during rotation.

8. A knotting system for a square baler, the knotting system comprising:
twine;
a variable width twine disc assembly, comprising:
a fixed assembly comprising a first disc having notches spaced along a periphery of the first disc and a shaft, the fixed assembly rotatable about an axis coincident with the shaft; and
a second disc having notches spaced along a periphery of the second disc and configured to be moveably adjusted along the shaft, the second disc rotatable in unison with the fixed assembly;
a spring disposed adjacent the second disc, the spring secured at one end to the shaft and at the other end in contact with the second disc, the spring configured to dynamically adjust a distance between the first and second discs, the variable distance suitable for the twine comprising any one of a plurality of dimensions; and
a needle configured to draw the twine according to a first motion through a first set of notches of the first and second discs and according to a second motion, draw the twine through a second set of notches of the first and second discs according to the rotation of the first and second discs.

9. The knotting system of claim 8, wherein the notches of the first and second discs are equally spaced from each other.

10. The knotting system of claim 8, wherein the notches of the first and second discs are aligned with each other during rotation.

11. A knotting system for a square baler, the knotting system comprising:
twine;
a variable width twine disc assembly, comprising:
a fixed assembly comprising a first disc having notches spaced along a periphery of the first disc and a shaft, the fixed assembly rotatable about an axis coincident with the shaft; and
a second disc having notches spaced along a periphery of the second disc and configured to be moveably adjusted along the shaft, the second disc rotatable in unison with the fixed assembly; and
a needle configured to draw the twine according to a first motion through a first set of notches of the first and second discs and according to a second motion, draw the twine through a second set of notches of the first and second discs according to the rotation of the first and second discs;
wherein the second disc is secured in place in a first position by a releasable securement member, the first disc and the second disc separated uniformly by a first distance, the first distance dimensionally suitable for the twine comprising a first dimension;
wherein the second disc is secured in place in a second position by the releasable securement member and one or more shim components, the one or more shim components arranged between the first and second discs, the first disc and the second disc separated uniformly by a second distance greater than the first distance, the second distance dimensionally suitable for the twine comprising a second dimension greater than the first dimension.

12. The knotting system of claim 11, wherein a single shim component of the one or more shim components is used, and wherein the first distance equals a width of the single shim component.

13. The knotting system of claim 11, wherein at least one of the one or more shim components comprises a defined radius, and is configured to be moveably adjusted along the shaft.

14. The knotting system of claim 11, wherein the notches of the first and second discs are aligned with each other during rotation.

* * * * *